United States Patent
Park

(10) Patent No.: US 9,003,521 B2
(45) Date of Patent: Apr. 7, 2015

(54) BASE STATION FOR DETECTING DENIAL-OF-SERVICE ATTACKS IN COMMUNICATION SYSTEM AND METHOD FOR CONTROLLING THE SAME

(71) Applicant: Samsung Electronics Co. Ltd., Suwon-si, Gyeonggi-do (KR)

(72) Inventor: Jang-Won Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 13/742,731

(22) Filed: Jan. 16, 2013

(65) Prior Publication Data

US 2013/0185794 A1 Jul. 18, 2013

(30) Foreign Application Priority Data

Jan. 17, 2012 (KR) ........................ 10-2012-0005234

(51) Int. Cl.
*H04W 12/00* (2009.01)
*H04W 12/12* (2009.01)

(52) U.S. Cl.
CPC .............. *H04W 12/00* (2013.01); *H04W 12/12* (2013.01)

(58) Field of Classification Search
CPC ..................... H04L 29/06925; H04L 63/1458; H04L 2463/141; H04L 2463/142; H04L 2463/143
See application file for complete search history.

(56) References Cited

U.S. PATENT DOCUMENTS

| | | | |
|---|---|---|---|
| 7,861,298 B1 * | 12/2010 | Giallorenzi et al. | 726/22 |
| 8,392,990 B2 * | 3/2013 | Shanmugavadivel et al. | 726/22 |
| 8,677,488 B2 * | 3/2014 | Kang et al. | 726/23 |
| 2005/0195840 A1 * | 9/2005 | Krapp et al. | 370/401 |
| 2006/0229022 A1 * | 10/2006 | Bu et al. | 455/69 |
| 2007/0226795 A1 * | 9/2007 | Conti et al. | 726/22 |
| 2008/0095187 A1 * | 4/2008 | Jung et al. | 370/468 |
| 2008/0320585 A1 * | 12/2008 | Ansari et al. | 726/13 |
| 2009/0019539 A1 * | 1/2009 | Jonnalagadda et al. | 726/14 |
| 2010/0299753 A1 * | 11/2010 | Yoo | 726/22 |
| 2011/0010771 A1 | 1/2011 | Olfat et al. | |
| 2011/0107412 A1 * | 5/2011 | Lee et al. | 726/11 |
| 2011/0113489 A1 * | 5/2011 | Nakhre et al. | 726/22 |
| 2011/0321161 A1 * | 12/2011 | Shanmugavadivel et al. | 726/22 |
| 2012/0036579 A1 * | 2/2012 | Lee et al. | 726/25 |
| 2013/0219502 A1 * | 8/2013 | Danford et al. | 726/23 |

FOREIGN PATENT DOCUMENTS

KR 2008046878 A * 5/2008

* cited by examiner

*Primary Examiner* — Michael R Vaughan
(74) *Attorney, Agent, or Firm* — Jefferson IP Law, LLP

(57) ABSTRACT

Provided is a base station for detecting Denial-of-Service (DoS) attacks in a communication system and a method for controlling the same. The base station includes a first estimator for estimating, for a predetermined time, a reception rate of data that is received at the base station from a communication network to be transmitted to at least one wireless terminal; a second estimator for estimating, for a predetermined time, a bandwidth allocated for transmission of data to the at least one wireless terminal, based on at least one of feedback information transmitted from the at least one wireless terminal and channel capacity of the base station; and a controller for calculating a ratio of the bandwidth to the reception rate for the at least one wireless terminal, and determining whether there is a DoS attack, using the calculated ratio.

10 Claims, 2 Drawing Sheets

BASE STATION FOR DETECTING DENIAL-OF-SERVICE ATTACKS IN COMMUNICATION SYSTEM AND METHOD FOR CONTROLLING THE SAME

PRIORITY

This application claims the benefit under 35 U.S.C. §119 (a) of a Korean Patent Application filed in the Korean Intellectual Property Office on Jan. 17, 2012 and assigned Serial No. 10-2012-0005234, the entire disclosure of which is incorporated herein by reference.

BACKGROUND OF THE INVENTION

1. Field of the Invention

The present invention relates generally to a base station for detecting Denial-of-Service (DoS) attacks in a communication system and a method for controlling the same, and more particularly, to a base station for detecting DoS attacks by considering the wireless communication environment and a method for controlling the same.

2. Description of the Related Art

DoS attacks refer to actions of maliciously attacking a system to make the system run out of resources, thus making it impossible for users to utilize the system for its originally intended purposes. For example, in the case of a communication system, if excessive traffic occurs on a wireless terminal, the wireless terminal may not normally communicate with a base station that it has accessed. In order to prevent these DoS attacks, the communication system is equipped with separate equipment for preventing the DoS attacks in the network, and controls the traffic by considering the characteristics of the incoming traffic. However, this method has difficulty in efficiently preventing the DoS attacks because the equipment for preventing the DoS attacks determines whether there is a DoS attack, after receiving data and processing the received data.

SUMMARY OF THE INVENTION

An aspect of exemplary embodiments of the present invention is to provide a base station capable of detecting DoS attacks by considering the characteristics of the communication network and the wireless environment, and a method for controlling the same.

Another aspect of exemplary embodiments of the present invention is to provide a base station capable of detecting DoS attacks by considering the data reception rate and the data transmission rate in the base station, and a method for controlling the same.

Further another aspect of exemplary embodiments of the present invention is to provide a base station capable of detecting DoS attacks by considering the traffic incoming from a communication network and the transmission bandwidth in a wireless network, and a method for controlling the same.

In accordance with one aspect of the present invention, there is provided a base station in a communication system. The base station includes a first estimator for estimating, for a predetermined time, a reception rate of data that is received at the base station from a communication network to be transmitted to at least one wireless terminal; a second estimator for estimating, for a predetermined time, a bandwidth allocated for transmission of data to the at least one wireless terminal, based on at least one of feedback information transmitted from the at least one wireless terminal and channel capacity of the base station; and a controller for calculating a ratio of the bandwidth to the reception rate for the at least one wireless terminal, and determining whether there is a Denial-of-Service (DoS) attack, using the calculated ratio.

In accordance with another aspect of the present invention, there is provided a method for controlling a base station in a communication system. The method includes estimating, for a predetermined time, a reception rate of data that is received at the base station from a communication network to be transmitted to at least one wireless terminal; estimating, for a predetermined time, a bandwidth allocated for transmission of data to the at least one wireless terminal, based on at least one of feedback information transmitted from the at least one wireless terminal and channel capacity of the base station; calculating a ratio of the bandwidth to the reception rate for the at least one wireless terminal; and determining whether there is a Denial-of-Service (DoS) attack, using the calculated ratio.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
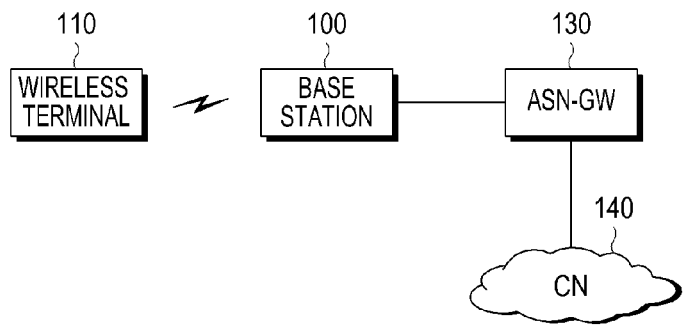
FIG. 1 illustrates a configuration of a communication system according to an embodiment of the present invention.

FIG. 1 illustrates a configuration of a communication system according to an embodiment of the present invention.

Referring to FIG. 1, a Core Network (CN) 140 refers to a high-speed backbone network of a large-scale communication network, in which high-capacity, long-distance voice and data services are available. For example, the CN 140 may correspond to Public Switched Telephone Network (PSTN), Integrated Services Digital Network (ISDN), International Mobile Telecommunication-2000 (IMT-2000), Wide Area Network (WAN), Local Area Network (LAN), Cable Television (CATV), and the like.

An Access Service Network-Gate Way (ASN-GW) 130 is responsible for connections between the CN 140 and a base station 100. The base station 100 transmits the data received from the CN 140 to a wireless terminal 110, and transmits the data provided from the wireless terminal 110 to the CN 140. The base station 100 may communicate with a plurality of wireless terminals, but only one wireless terminal is considered in FIG. 1 for convenience purpose only.

The channel capacity of the base station 100 may be influenced by a variety of factors such as base station's Radio Frequency (RF) configuration, Time Division Duplexing (TDD) ratio, Multiple Input Multiple Output (MIMO) configuration, the number of accessed wireless terminals, and the moving speed of accessed wireless terminals. For example, if the base station 100 employs MIMO, its transmission capacity may be as follows.

In the base station 100, if a receive vector is defined as y and a transmit vector is defined as x, a relationship between the transmit and receive vectors is as shown in Equation (1) in accordance with a channel matrix H and a noise vector n.

$$y = Hx + n \quad (1)$$

If the total power of the base station 100 is limited to a value of P, then $\epsilon[x^T x] \leq P$, where T denotes a transpose conversion, and $\epsilon[\ ]$ denotes an expectation value.

If the base station 100 uses a MIMO system comprised of N Transmitter (Tx) antennas and M Receiver (Rx) antennas, the channel capacity $C_{EP}$ of the base station 100 can be determined using Equation (2).

$$C_{EP} = \log_2\left[\det\left(I_M + \frac{\rho}{N} H H^*\right)\right] b/s/\text{Hz} \quad (2)$$

where $I_M$ denotes a covariance term of Gaussian noise, $\rho$ denotes a signal-to-noise ratio, H* denotes a transpose-conjugate of H, and N denotes the number of transmission sources which have the Equal Power (EP) and are not associated with each other.

Equation (2) may be developed as Equation (3).

$$C_{EP} = \sum_{i=0}^{m} \log_2\left[\det\left(I_M + \frac{\rho}{N} \lambda_i\right)\right] b/s/\text{Hz} \quad (3)$$

where $\lambda_i$ denotes an Eigen-value of the following formula W, and m denotes min(M, N).

$$W = \begin{cases} HH^*, & M \leq N \\ H^*H, & N \geq M \end{cases}$$

If noise level information of the channel is known for each frequency band, the channel capacity $C_{WF}$ of the base station 100, which is optimized according to a Water Filling (WF) algorithm, may be found using Equation (4).

$$C_{WF} = \sum_{i=1}^{m} \log_2(\mu \lambda_i) b/s/\text{Hz} \quad (4)$$

where $\mu$ denotes a complex function value determined by $\lambda_i$, and it can be calculated for any channel, using a numerical algorithm. In addition, m denotes min(M, N). If the optimal power allocation conditions are satisfied, $\mu$ meets Equation (5).

$$\rho = \sum_{i=1}^{m} \log_2(\mu - \lambda_i^{-1}) \quad (5)$$

The maximum capacity that can be provided to N wireless terminals which are simultaneously connected in the cell may not exceed the maximum capacity estimated in the base station 100. In other words, if the base station 100 is optimized by the WF algorithm, the maximum bandwidth that can be used by all wireless terminals may be limited as defined in Equation (6).

$$\sum_{1}^{N} \gamma_k < C_{WF} \quad (6)$$

where $\gamma_k$ denotes a bandwidth allocated to each wireless terminal in the cell.

If a data reception rate for the data that the base station 100 receives from the CN 140 to transmit to a k-th wireless terminal is assumed as $\pi_k$, then link utilization $\phi_k$ of the k-th wireless terminal meets Equation (7).

$$\phi_k = \frac{\pi_k}{\gamma_k} \leq 1 \quad (7)$$

Assuming that $p_k$ is a ratio of the bandwidth allocated to a specific wireless terminal 110 to the maximum bandwidth of the base station 100, if there is no DoS attack, the transmission bandwidth that the wireless terminal 110 is allocated meets Equation (8). In this case, each wireless terminal is allocated a band corresponding to $p_k$ in the entire bandwidth.

$$\mu_k = p_k C_{WF} \quad (8)$$

Since a sum of ratios of the bandwidths allocated to all wireless terminals is 1, Equation (9) is met.

$$\log\left(\sum_k p_k\right) = 0 \quad (9)$$

If N wireless terminals have accessed the base station 100 and each wireless terminal is allocated the same bandwidth, Equation (10) is satisfied.

$$\log(N \times p_k) = \log\left(N \times \frac{1}{N}\right) = 0 \quad (10)$$

As to a ratio of a receive band to a transmit band for each wireless terminal in a steady state which is equal to the receiving state in terms of transmission, Equation (10) may be approximated as Equation (11) for N wireless terminals.

$$\sum_{k=1}^{n} \log\left(\frac{\lambda_k}{\mu_k}\right) \cong 0 \quad (11)$$

The base station 100 may determine whether there is a DoS attack, using the transmission bandwidth it allocated to each wireless terminal and the ratio of a data reception rate at which it receives data from the CN 140. In other words, when expressed as a function of time, the sum of the ratio of the bandwidth allocated to each wireless terminal in the cell to the data reception rate for each wireless terminal that receives data from the CN 140 is as shown in Equation 12.

$$H(n, t) = \sum_{k=1}^{n} \log\left(\frac{\pi_k(t)}{\gamma_k(t)}\right) \quad (12)$$

where N denotes the number of wireless terminals that have accessed the base station 100. The base station 100 may determine whether there is a DoS attack, using Equation (12). For example, if N wireless terminals have accessed the base station 100, the base station 100 takes, for a predetermined time T, an average of the sum of the ratio of the bandwidth allocated to each wireless terminal 110 to the data reception rate for each wireless terminal 110 that receives data from the CN 140, and if the average exceeds a predetermined threshold Y, the base station 100 may determine that there is a DoS attack. This can be represented by Equation (13).

$$\frac{1}{T}\int^{T}\left[\sum_{i}^{N} \log\left(\frac{\pi_k(t)}{\gamma_k(t)}\right)\right] dt > Y \quad (13)$$

Also, after taking, for a predetermined time T, an average of the ratio of the bandwidth allocated to a specific wireless terminal 110 to the data reception rate for the wireless terminal 110 that receives data from the CN 140, the base station 100 may determine that there is a DoS attack on the wireless terminal 110, if the average exceeds a predetermined threshold $Y_K$. This can be represented by Equation (14).

$$\frac{1}{T}\int^{T} \log\left(\frac{\pi_k(t)}{\gamma_k(t)}\right) dt > Y_K \quad (14)$$

In order to efficiently determine whether there is a DoS attack using Equations (12) to (14), it is important for the base station 100 to adaptively estimate the bandwidth allocated to each wireless terminal depending on the state of the wireless terminal. A description will now be made of a method for estimating the bandwidth that the base station 100 allocates to each wireless terminal.

Figure 2:
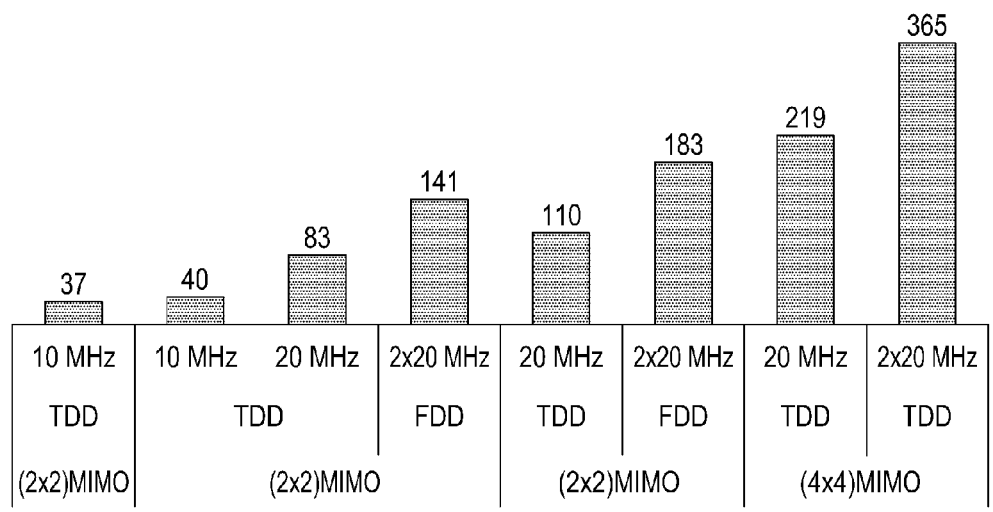
FIG. 2 illustrates characteristics of a base station in a communication system according to an embodiment of the present invention.

FIG. 2 illustrates characteristics of a base station 100 in a communication system 10 according to an embodiment of the present invention.

Referring to FIG. 2, the maximum bandwidth of the base station 100 is closely related to the MIMO type used in the base station, whether the base station uses TDD or Frequency Division Duplexing (FDD), the Down Load (DL)/Up load (UL) ratio, service category type, and the like.

The data transmission rate (i.e., data rate) that the wireless terminal 110 in communication with the base station 100 can be allocated by the base station 100 may be determined by a variety of factors such as the location and MIMO configuration of the wireless terminal 110 in the cell, and the mobility of the mobile terminal 110. For example, Table 1 shows a variety of data rates of the wireless terminal 110.

TABLE 1

| Parameter | MIMO configuration | Performance of Mobility |
|---|---|---|
| Peak DL Spectral Efficiency | (2×2) MIMO | 8.5 bps/Hz |
| | (4×4) MIMO | 17.0 bps/Hz |
| Average DL Spectral Efficiency | (4×2) MIMO | 3.2 bps/Hz |
| | | 0.32 bps/Hz/User |
| DL Cell-Edge User Spectral Efficiency | (4×2) MIMO | 0.08 bps/Hz |

If the mobility of the wireless terminal 110 and the dynamic variation of the channel environment are taken into consideration, the bandwidth that the base station 100 allocates to the wireless terminal 110 with respect to the data rate of the wireless terminal 110 may be dynamically changed. Therefore, the base station 100 receives feedback information such as Channel State Information (CSI) and Channel Quality information (CQI) from the wireless terminal 110, and allocates a bandwidth to the wireless terminal 110 using the feedback information. Specifically, if the wireless terminal 110 provides its feedback such as CSI and CQI to the base station 100, the base station 100 performs Adaptive Modulation and Coding (AMC) scheduling using the feedback information and determines a Modulation and Coding Scheduling (MCS) level that is appropriate for the channel state of the wireless terminal 110. Thereafter, the base station 100 allocates the bandwidth, over which the wireless terminal 110 can transmit data per unit frequency and symbol, to the wireless terminal 110 using the determined MCS level.

The bandwidth that the base station 100 allocated to the wireless terminal 110 may be found using Equation (15).

$$\gamma_k = \max\left(\overline{\gamma}_k, \int \gamma_k(t) dt\right) \quad (15)$$

where, $$\overline{\gamma}_k = \frac{C_{WF}}{N} \times T$$

$$\int_{t=t_i}^{t=t_i+T} \gamma_k(t) dt = \int_{t=t_i}^{t=t_i+T} G_{BS} * \xi_k(t) dt$$

where $G_{BS}$ denotes a gain information mapping function that reflects the bandwidth characteristics of the base station 100, and $\xi_k(t)$ denotes a function of the instantaneous bandwidth that a scheduler allocates to a terminal k. As to information about the bandwidth that is allocated at a specific time for a time T and an average of $\gamma_k$ given when N wireless terminals evenly share the bandwidth for a time T, a larger value of them is determined as bandwidth allocation information for the terminal.

Figure 3:
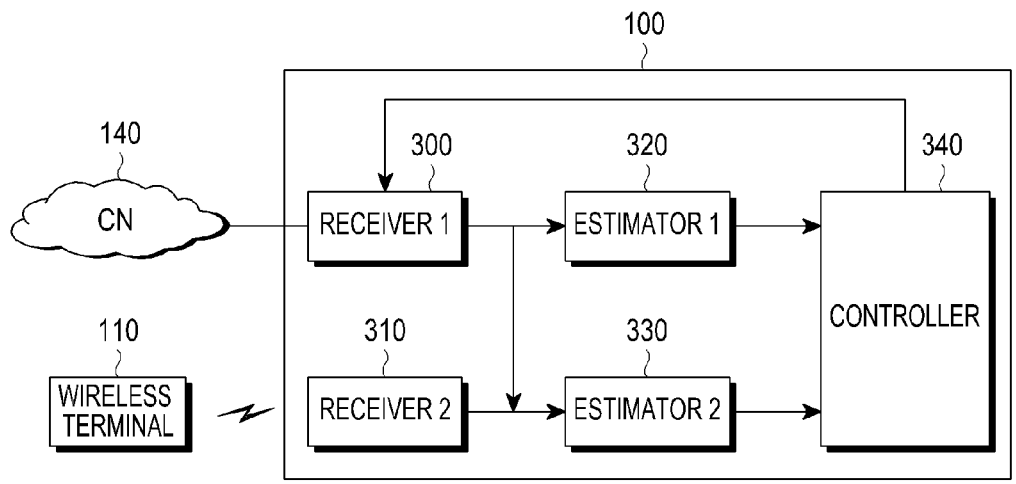
FIG. 3 illustrates a structure of a base station in a communication system according to an embodiment of the present invention.

FIG. 3 illustrates a structure of a base station 100 in a communication system 10 according to an embodiment of the present invention. Although it is assumed in FIG. 3 that one wireless terminal is connected to the base station 100, if the base station 100 is connected to a plurality of wireless terminals, the base station 100 may have the same configuration for each of the wireless terminals. In FIG. 3, the ASN-GW 130 is omitted for convenience of description.

Referring to FIG. 3, the base station 100 includes first and second receivers 300 and 310, first and second estimators 320 and 330, and a controller 340.

The first receiver 300 receives, from the CN 140, data to be transmitted to the wireless terminal 110, and the first estimator 320 estimates a reception rate for the data received from the first receiver 300. If connected to a plurality of wireless terminals, the base station 100 estimates the data reception rate for each of the wireless terminals.

The second receiver 310 receives feedback information such as CSI and CQI from the wireless terminal 110, and the second estimator 330 estimates a transmission bandwidth allocated to the wireless terminal 110 and a data transmission rate corresponding to the transmission bandwidth, using the feedback information transmitted from the wireless terminal 110. For the estimation, the second estimator 330 may use, for example, Equation (15). If connected to a plurality of wireless terminals, the base station 100 estimates a bandwidth and/or its associated data transmission rate for each of the wireless terminals.

The controller 340 determines whether there is a DoS attack using, for example, Equation (13) or (14) based on information about the data rates output from the first and second estimators 320 and 330 and the bandwidth for the wireless terminal 110. Upon detecting a DoS attack, the controller 340 may control the first receiver 300 to block the reception of the data to be transmitted to the wireless terminal 110. Although will not be shown, the controller 340 may include a Digital Signal Processor (DSP), and it may receive data and feedback information from the first and second receivers 300 and 310, and perform AMC scheduling and bandwidth allocation for each wireless terminal.

Figure 4:
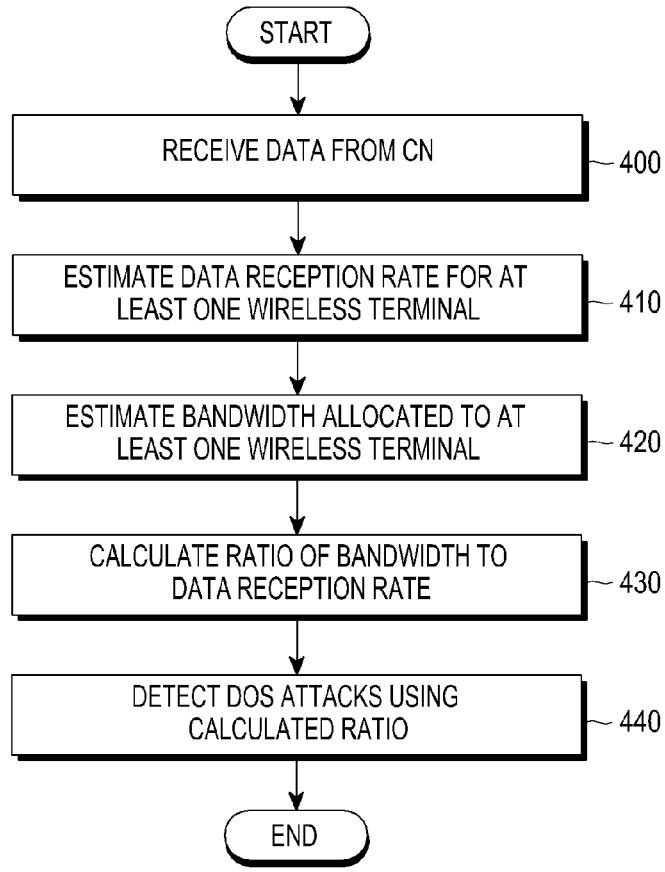
FIG. 4 is a flowchart illustrating an operation of a base station in a communication system according to an embodiment of the present invention.

FIG. 4 is a flowchart illustrating an operation of a base station 100 in a communication system 10 according to an embodiment of the present invention.

Referring to FIG. 4, if the first receiver 300 receives data for at least one wireless terminal from the CN 140 for a predetermined time T in step 400, the first estimator 320 estimates a data reception rate for each wireless terminal in step 410. In step 420, the second estimator 330 estimates a bandwidth allocated to each wireless terminal 110 and a data rate in the bandwidth using the feedback information from the at least one wireless terminal, which is output from the second receiver 310. Although the base station 100 is assumed to estimate a bandwidth after estimating a data reception rate, steps 410 and 420 may be performed independently regardless of the order.

The controller 340 calculates a ratio of a bandwidth allocated to each wireless terminal 110 to a data reception rate for each wireless terminal 110 in step 430, and determines in step 440 whether there is a DoS attack, using Equation (13) or (14).

Although will not be described in detail, additional operations may be defined depending on whether DoS attacks are detected or not. For example, upon detecting a DoS attack, the base station may perform a predetermined algorithm designed to mitigate the DoS attack on the base station and/or terminal, based on the type of the DoS attack and the information about the terminal, which is the target of the DoS attack.

As is apparent from the foregoing description, the base station monitors whether there is a DoS attack by considering the communication network and the wireless communication environment, making it possible to efficiently prevent DoS attacks.

In addition, the base station monitors whether there is a DoS attack, using the relationship between the reception rate for the data received from the communication network and the bandwidth allocated to the wireless terminal, thereby making it possible to detect DoS attacks more precisely and adaptively.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A base station in a communication system, comprising:
   a first estimator for estimating, for a predetermined time, a reception rate of data that is received at the base station from a communication network to be transmitted to at least one wireless terminal;
   a second estimator for estimating, for a predetermined time, a bandwidth allocated for transmission of the data to the at least one wireless terminal, based on at least one of feedback information transmitted from the at least one wireless terminal, channel capacity of the base station, and a gain information mapping function that reflects bandwidth characteristics of the base station; and
   a controller for calculating a ratio of the bandwidth to the reception rate for the at least one wireless terminal, and determining whether there is a Denial-of-Service (DoS) attack, using the calculated ratio,
   wherein the gain information mapping function is provided to calculate a gain using at least one of multi-antenna configuration information of the base station, service category type information and Modulation and Coding Scheduling (MCS) level information determined based on the feedback information.

2. The base station of claim 1, wherein the controller determines that there is a DoS attack, if an average of a sum of the ratio of the bandwidth to the reception rate is greater than a first threshold with respect to the at least one wireless terminal for the predetermined time.

3. The base station of claim 1, wherein the controller determines that there is a DoS attack, if an average of the ratio of the bandwidth to the reception rate is greater than a second threshold with respect to each wireless terminal for the predetermined time.

4. The base station of claim 1, wherein the second estimator estimates the bandwidth using a time function of a MCS level and a symbol rate assigned to each wireless terminal.

5. The base station of claim 1, wherein the second estimator estimates the bandwidth using at least one of multi-antenna configuration information of the base station and information about a count of the at least one wireless terminal in addition to the channel capacity of the base station.

6. A method for controlling a base station in a communication system, comprising:
   estimating, for a predetermined time, a reception rate of data that is received at the base station from a communication network to be transmitted to at least one wireless terminal;
   estimating, for a predetermined time, a bandwidth allocated for transmission of the data to the at least one wireless terminal, based on at least one of feedback information transmitted from the at least one wireless terminal, channel capacity of the base station, and a gain information mapping function that reflects bandwidth characteristics of the base station;
   calculating a ratio of the bandwidth to the reception rate for the at least one wireless terminal; and
   determining whether there is a Denial-of-Service (DoS) attack, using the calculated ratio,
   wherein the gain information mapping function is provided to calculate a gain using at least one of multi-antenna configuration information of the base station, service category type information and Modulation and Coding Scheduling (MCS) level information determined based on the feedback information.

7. The method of claim 6, wherein the determining comprises determining that there is a DoS attack, if an average of a sum of the ratio of the bandwidth to the reception rate is greater than a first threshold with respect to the at least one wireless terminal for the predetermined time.

8. The method of claim 6, wherein the determining comprises determining that there is a DoS attack, if an average of the ratio of the bandwidth to the reception rate is greater than a second threshold with respect to each wireless terminal for the predetermined time.

9. The method of claim 6, wherein the estimating a bandwidth comprises estimating the bandwidth using a time function of a MCS level and a symbol rate assigned to each wireless terminal.

10. The method of claim 6, wherein the estimating a bandwidth comprises estimating the bandwidth using at least one of multi-antenna configuration information of the base station and information about a count of the at least one wireless terminal in addition to the channel capacity of the base station.

* * * * *